Aug. 8, 1961     H. O. O. MÜLLER ET AL     2,995,001
APPARATUS FOR PICKING AND HUSKING INDIAN CORN
Filed March 16, 1959     6 Sheets-Sheet 6
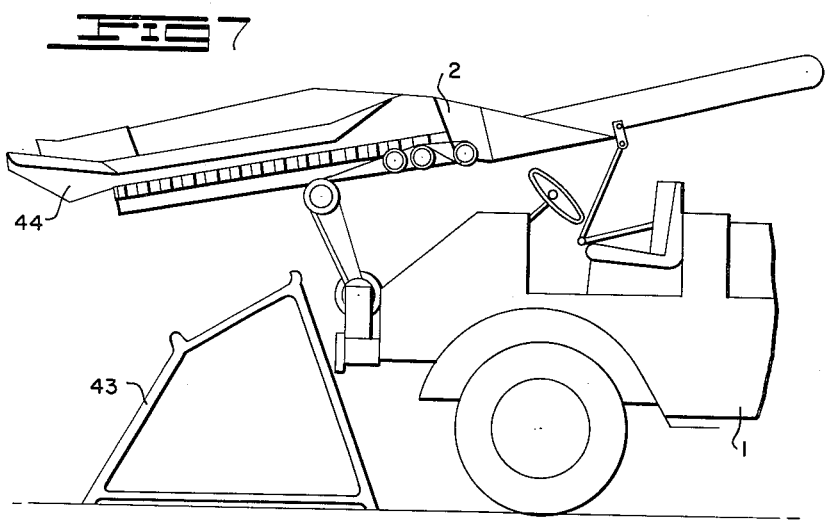
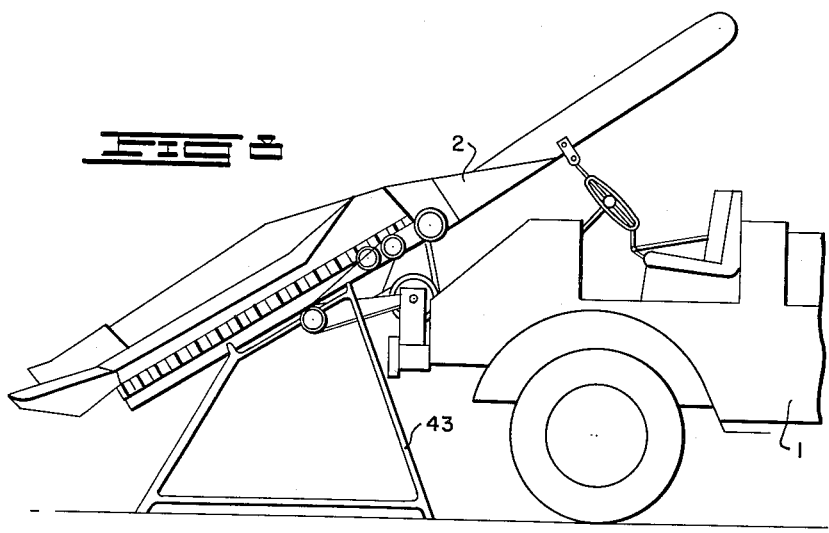
INVENTORS
HANS MÜLLER
LEONHARD ARNDT
HEINRICH G. F. RÖSSLER
ATTORNEYS United States Patent Office 2,995,001
Patented Aug. 8, 1961

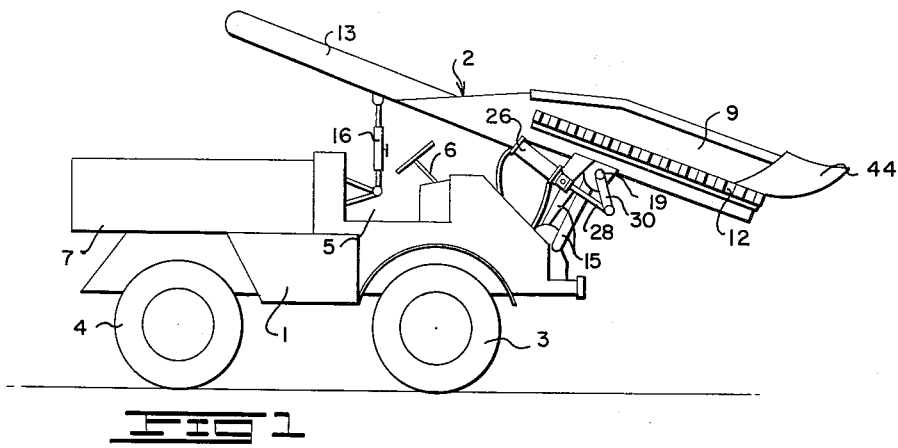
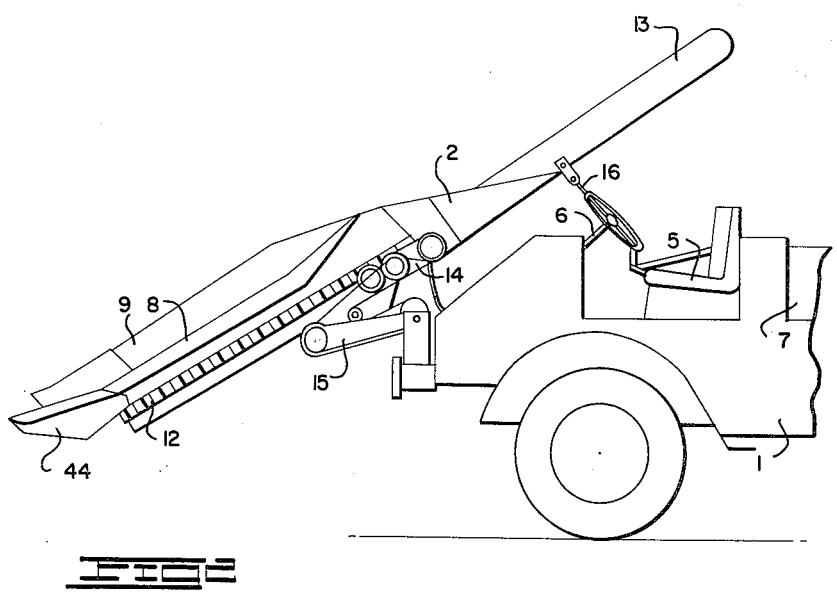

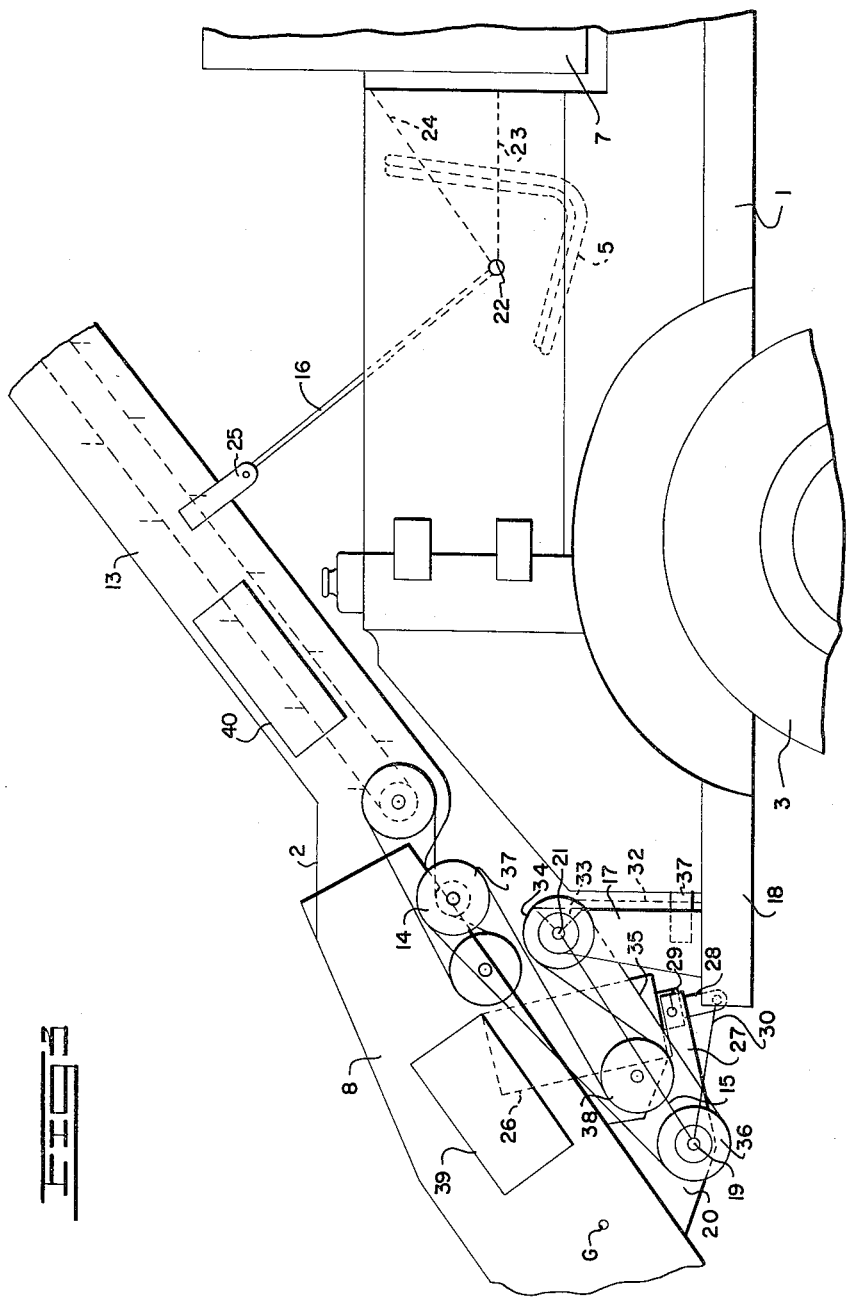

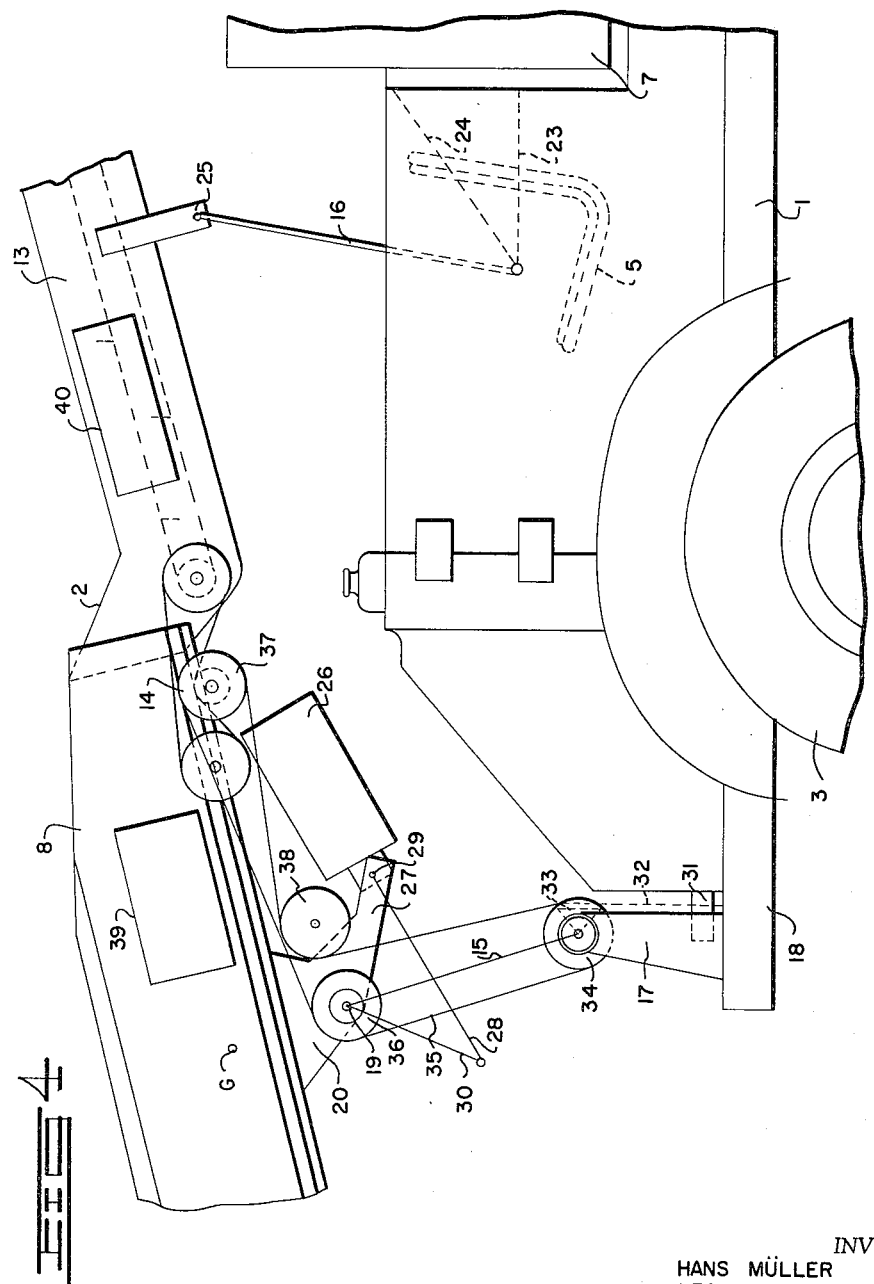

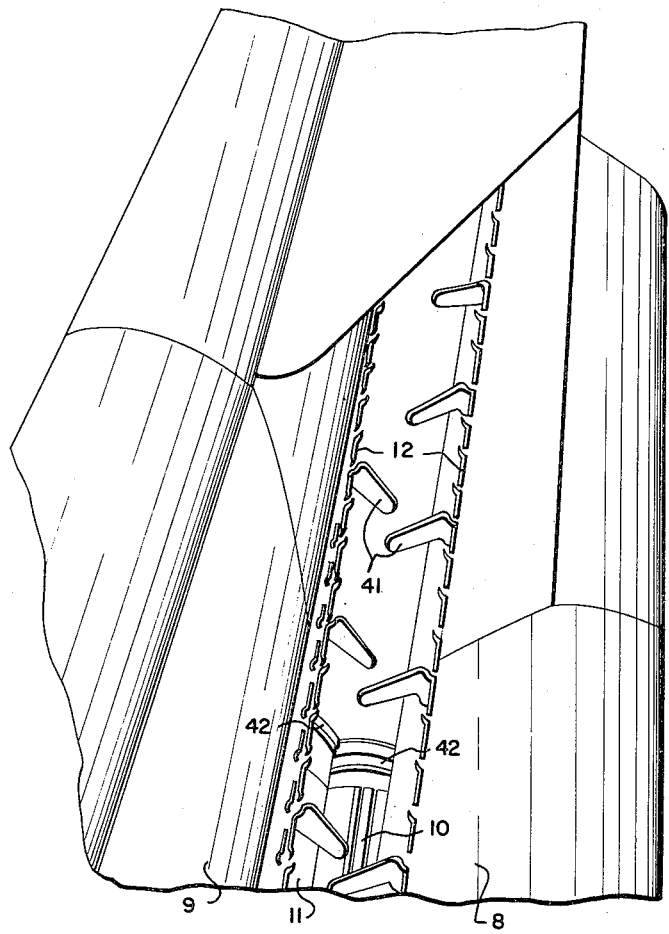

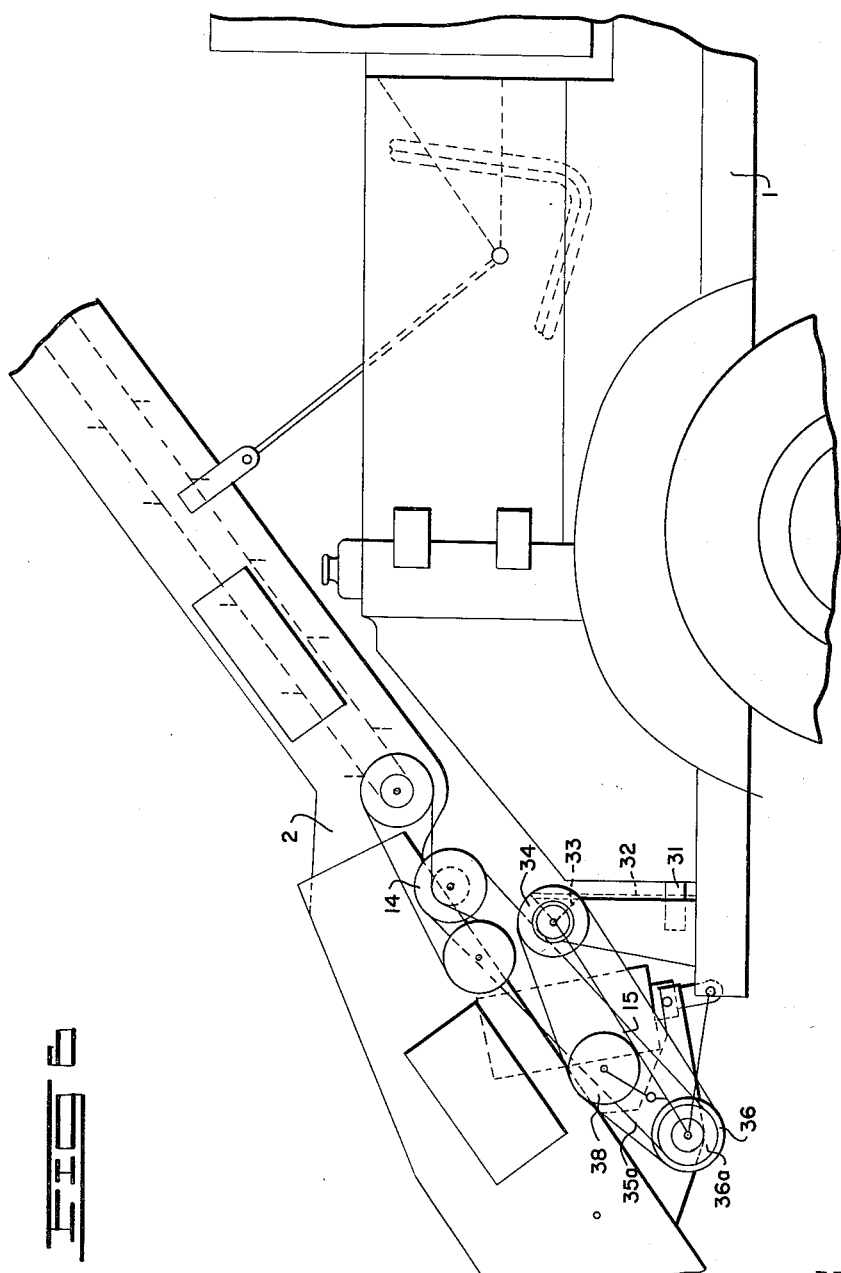

2,995,001
APPARATUS FOR PICKING AND HUSKING INDIAN CORN
Hans-Oskar Otto Müller, Miel, via Rheinbach, Landkreis Bonn, Land, Leonhard Arndt, Gaggenau, and Heinrich G. F. Rössler, Baden-Baden, Germany, assignors to Daimler-Benz Aktiengesellschaft, Stuttgart-Unterturkheim, Germany
Filed Mar. 16, 1959, Ser. No. 799,710
Claims priority, application Germany Mar. 15, 1958
10 Claims. (Cl. 56—18)

The present invention relates to an apparatus for picking, husking, and collecting Indian corn or maize. This apparatus essentially consists of a motor vehicle, for example, a tractor, which has a container thereon for collecting the husked ears of corn, and the wheel axles of which are preferably spring supported relative to the vehicle chassis, and of a corn picking, husking, and conveying mechanism which essentially comprises a corn picking device, a pair of spaced guide plates forming a conveying chute leading from the corn picking device to a point above the same, conveyer chains running along the inner side of the conveying chute and provided with carrier fingers for taking along the corn ears, one or more pairs of husking rollers mounted in the gap between the guide plates and driven in opposite directions to each other for removing the husks from the ears of corn, and a conveyer for receiving the husked ears of corn from the conveyor chains and conveying them to a point above the container on the vehicle and for then dropping them into the container.

It is the primary object of the present invention to provide the most suitable manner of mounting a corn picking and husking apparatus on a motor vehicle, a safe, effective, and economical manner of driving this apparatus, and an improved design and construction of the apparatus itself. A further object of the invention is to provide a corn picking and husking apparatus which is designed so as to form a single unit which during its operation is mounted on a motor vehicle, for example, a tractor, and which may be easily removed therefrom to permit the vehicle to be used for other purposes.

A feature of the invention for attaining these objects consists in pivotably mounting the entire corn picking, husking, and conveying apparatus on the front end of the vehicle above the side adjacent to the driver's seat so as to be pivotally adjustable to different elevations above the ground on a pair of supporting arms which are pivotably connected at one end to the vehicle in front of the front wheel axle thereof and at the other end to the apparatus itself preferably at a point near the center of gravity thereof, and in providing another arm which is preferably adjustable in length and pivotably connected at one end to the vehicle at a point behind its front wheel axle and at the other end to the apparatus near the rear end thereof.

Another feature of the invention consists in connecting the two main supporting arms to each other and in pivotably connecting them to the husking apparatus by means of a shaft which is rotatably mounted on the apparatus and has a lever rigidly secured thereto which is pivotably connected to a piston rod, the piston on which is preferably adapted to be acted upon by a pressure medium on either side and is slidable within a cylinder which is pivotably mounted on the husking apparatus at a point near the pivotal axis of the apparatus, that is, near the mentioned shaft. This construction permits the forces occurring when the apparatus is being raised or lowered to be arrested within the shortest possible distance and to be easily compensated.

Another feature of the invention resides in providing a very advantageous driving mechanism for the corn husking and conveying apparatus which consists in a driving gear which is mounted at a point coinciding with the pivoting axis of the supporting arms on the vehicle and is adapted to be connected to a power take-off at the front end of the motor vehicle and to drive an endless belt or chain which, in turn, drives a gearing which is adapted to drive the husking rollers, the conveyer chains and the further conveyer and which is mounted on the apparatus between the two main supporting arms and the other supporting arm. In order to insure that this driving belt or chain will always retain a substantially constant length at any pivotal angle of the apparatus relative to the ground, the invention further provides an intermediate guide pulley or wheel for supporting the belt or chain at a point coinciding with the pivoting axis of the two supporting arms on the husking apparatus. A tension pulley or wheel which may also form the guide for the slack strand of the belt or chain may also be mounted on the husking apparatus at a point near the first-mentioned guide pulley or wheel.

A further important feature of the invention consists in mounting the conveyer for the husked corn ears on the husking apparatus and substantially in a straight line with the husking rollers. Such arrangement avoids the necessity of deflecting or rerouting the ears of corn during their movement from the conveying chains to this conveyer which might result in an obstruction or congestion in the feeding movement of the ears of corn toward the container on the vehicle.

The upper end of each of the counter-rotating husking rollers may according to the invention also be provided with a ring which is fixed thereon and thus rotatable therewith and has a radial thickness substantially corresponding to the width of the gap between the two husking rollers. The two rings on these rollers are displaced relative to each other in the axial direction of the rollers so that the ring on one roller is disposed closely behind the ring on the other roller. These rings insure that all of the husks will be completely removed from the ears of corn and will not be taken along to the conveyer.

Another feature of the invention consists in providing suitable inspection windows in one guide plate and in the covering wall of the conveyer at the side facing toward the driver's seat so that the driver while driving the vehicle may easily inspect the operation of the husking rollers and of the conveyer. The apertures for these windows are preferably covered with sheets of transparent plastic or with screens.

Finally, the invention provides a separate support for receiving the entire corn picking, husking, and conveying apparatus when the latter is not to be used and when the motor vehicle, for example, a farm tractor, is to be used for other purposes. In such case, the tractor with the apparatus thereon in the elevated position is driven centrally against the support which preferably consists of a frame of a substantially trapezoidal shape.

Thereupon the end of the apparatus with the corn picking device thereon is lowered until the whole apparatus comes to rest upon the support. The three supporting arms and the driving connection of the apparatus may then be easily disconnected from the truck which may then be driven off. For mounting the apparatus on the truck, the opposite procedure is followed.

These and further objects, features, and advantages of the present invention will also become apparent from the following detailed description thereof, particularly when read with reference to the accompanying diagrammatic drawings in which—

FIGURE 1 shows a view of the entire tractor-mounted corn picking and husking apparatus as seen from the operating side thereof;

FIGURE 2 shows a view of the apparatus as seen from the driving side thereof, that is, from the side opposite to FIGURE 1;

FIGURE 3 shows a view of the apparatus similar to FIGURE 2 on a slightly larger scale with the apparatus in the operative position;

FIGURE 4 shows a view of the apparatus similar to FIGURE 3, but with the apparatus in the inoperative transporting position;

FIGURE 5 shows a partial perspective view seen from above upon the upper end of the husking rollers;

FIGURE 6 shows a view of the apparatus similar to FIGURE 3, but including a modification of the drive mechanism;

FIGURE 7 shows a side view of the corn picking and husking apparatus in the transporting position with a separate auxiliary supporting frame for dismounting the apparatus from the tractor; while FIGURE 8 shows a view similar to FIGURE 7 with the apparatus resting upon the supporting frame ready for its removal from the tractor.

Referring to the drawings, FIGURES 1 and 2 illustrate the entire appartaus as essentially consisting of a motor vehicle 1 in the form of a farm tractor and an apparatus 2 for picking and husking Indian corn or maize mounted on the tractor and disposed above the front end thereof. The wheels 3 and 4 of the tractor are provided with pneumatic tires, and the wheel axles are supported relative to the chassis frame of the tractor in conventional manner by spring means (not shown). Behind the driver's seat 5 and the steering means 6, the tractor has a loading platform 7. Otherwise the vehicle has the usual equipment of farm tractors, namely, means for driving both wheel axles, a differential lock, a special low-speed or creeping gear, etc., so as to permit the tractor to be driven on any terrain. Since this equipment is conventional and well known and does not form the subject of the present invention, it is not illustrated. It is also equipped with an apparatus of conventional form (not shown) for producing compressed air, as well as with a power take-off at the front end and also at the rear end of the chassis in accordance with common practice in equipping farm tractors, as illustrated, for example, in the patent to Roszler et al. 2,853,142. The corn picking and husking apparatus 2 comprises a corn picking device 44 at its forward end, a pair of spaced guide plates 8 and 9 adjoining the corn picking device 44 and shaped so as to form an elongated trough, and at least one pair of husking rollers 10 and 11 rotatable in opposite directions to each other and mounted underneath the upper surface of the guide plates 8 and 9 and partly extending into the gap between these plates for removing the husks from the ears of corn. Conveyor chains 12 having carrier fingers 41 thereon are supported on rollers, not shown, and movable along guide plates 8 and 9. In line with and behind husking rollers 10 and 11 a conveyer 13 is provided which is adapted to convey the ears of corn after being husked to the loading platform 7 and to drop them thereon. Husking rollers 10 and 11, conveyer chains 12 and conveyer 13 are driven by a first gearing 14, comprising rotatable members interconnected by endless flexible means.

The corn picking and husking apparatus 2 is mounted on tractor 1 by a pair of main supporting arms 15 and by a further single arm 16 which is adjustable in length by conventional means.

As illustrated in greater detail in FIGURES 3 and 4, supporting arms 15 are pivotably mounted in front of the engine of tractor 1 and in front of the front-wheel axle on a shaft 21 which, in turn, is mounted on a supporting bracket 17 secured to frame 18. The other ends of arms 15 are connected by and integrally mounted on a shaft 19 which is rotatably secured to the frame of the apparatus 2 by means of brackets 20 at a point substantially in line with the center of gravity G of the apparatus in front of the gearing 14. The single supporting arm 16 which is adjustable in length is pivotably mounted at one end at a point 22 behind the front axle of the tractor adjacent to the driver's seat above the point usually reserved for another seat on supporting brackets 23 and 24 which are secured to the body of the tractor. The other end of supporting arm 16 is pivotably connected to a bracket or plate 25 which is secured to the conveyer 13 behind the gearing 14.

For elevating the entire picking and husking apparatus and pivoting it toward the rear, and for lowering the picking device 44 by pivoting the apparatus about the axis 21 and also about point 22 within a vertical longitudinal plane of tractor 1, the apparatus is provided with an elevating mechanism which is operated by air pressure produced by suitable means, not shown. The cylinder 26 of this mechanism is pivotably mounted on an extension 27 of one of the brackets 20 at a point 29 near the end of the cylinder through which the piston rod 28 extends. At the inside of cylinder 26, piston rod 28 carries a piston (not shown) which is adapted to be acted upon by compressed air on either side, while the outer end of piston rod 28 is pivotably connected to a lever 30 which is rigidly secured to shaft 19. If compressed air is passed into cylinder 26 so as to move piston rod 28 in the outward direction, the entire apparatus 2 will be elevated and pivoted toward the rear, while when the compressed air is passed into cylinder 26 so as to move piston rod 28 toward and into the cylinder, the apparatus will be lowered and shifted forwardly until the picking device 44 will be close to the ground. Suitable means not shown but commonly known as such are also provided for controlling the compressed air supply to cylinder 26 so that the apparatus may be quickly adjusted to any desired elevation above the ground. For driving the tractor with the picking device 44 in the raised inoperative position, it is advisable to lift the apparatus to a medium elevation since it will then be cushioned in either direction of its pivotal movement relative to the vehicle by an air cushion at both sides of the piston within cylinder 26.

The drive for the husking and conveying mechanism is transmitted from a power take-off 31 at the front end of the tractor through a roller chain 32 and a bevel gearing 33 constituting a power take-off means. The central axis of the driven bevel gear of gearing 33 coincides with the pivoting axis 21 of supporting arms 15 and also with the axis of a drive pulley 34 for driving a V-belt 35. The driving strand of V-belt 35 runs from pulley 34 over a guide wheel or pulley 36, which is rotatably mounted on shaft 19, to a drive pulley 37 which is connected to gearing 14 for driving the same, while the slack strand of V-belt 35 runs from pulley 37 back to pulley 34 over a tension wheel or pulley 38, the shaft of which is mounted underneath the bottom of the apparatus near the guide wheel or pulley 36. The aforementioned wheels or pulleys and interconnecting belts constitute a second gearing.

A comparison of FIGURES 3 and 4 clearly shows that the length of V-belt 35 remains substantially the same at the different pivoting positions of the entire apparatus 2 and its movement about the axis 21 and point 22.

Guide plate 8 is provided with a window aperture 39 which is covered with a sheet of transparent plastic or a screen to permit the driver of the tractor to inspect the husking operation without leaving his seat. For the same purpose, the conveyer 13 is likewise provided in its side wall facing toward the driver's seat with a window aperture 40 which is covered with a sheet of transparent plastic or a screen.

FIGURE 5 illustrates the husking rollers 10 and 11 which are rotatable in opposite directions to each other between the guide plates 8 and 9. Above these rollers and running in the axial direction thereof, the conveyer chains 12 are mounted which are provided with the carrier plates or fingers 41. The rear end of each husking roller has a ring 42 secured thereto which has an outer diameter so as substantially to fill out the gap between the two rollers. The ring on one of the husking rollers is displaced in the axial direction relative to the ring on the other roller so as to lie closely behind the latter. These rings 42 are provided so as to ensure that, despite the straight-lined direction of operation on the corn ears, every bract of the husk will be removed from the ear of corn and prevented from passing to the conveyer 13.

As illustrated in FIGURE 6, the driving gearing 14 of the apparatus 2 may be driven by the power take-off 31 which is connected through roller chain 32 and bevel gears 33 to the drive pulley 34 which, in turn, is connected by the V-belt 35 to pulley 36 via a tension pulley 38, and then another pulley 36a which is secured to pulley 36 is then connected by a second V-belt 35a to the intermediate pulley of the driving gearing 14. Tension pulley 38 is preferably mounted on one of the arms 15.

For removing the entire corn picking and husking apparatus 2 from the tractor 1 so that the latter may be used for other purposes, as well as for conveniently mounting the apparatus 2 on the tractor, the invention further provides a separate supporting frame 43 of a substantially trapezoidal shape. As illustrated in FIGURES 7 and 8, this supporting frame 43 is then placed directly in front of the tractor 1. For removing the apparatus 2 from the tractor, the front end thereof is first lowered until it comes to rest upon the supporting frame 43, whereupon the operator may disconnect the easily accessible supporting arms 15 and 16 from the tractor. Similarly, for remounting the apparatus 2 on the tractor, it is merely necessary to drive the latter centrally against the supporting frame 43 until it touches it, whereupon the supporting arms 15 and 16 may be reconnected to the tractor.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In a harvester apparatus of the type disclosed comprising a harvesting unit adapted to be mounted upon a motor vehicle, said unit comprising a corn picking device, guide plates and husking means operatively associated with said corn picking device, conveyor means adjacent and rearward of said guide plates, means mounting said unit on the front end of said vehicle comprising a pair of supporting arms pivotally connected at one end of each of said arms to said harvesting unit at a point where the picking device, guide plates, husking means and conveyor means are in substantially counterbalanced relation, the other ends of said arms being connected to said vehicle, a pivotally mounted arm interconnecting a rearward part of said unit and said vehicle and disposed rearwardly of said supporting arms, and a selectively operable elevating mechanism operatively connected with said supporting arms.

2. In a harvester apparatus as defined in claim 1, said means mounting said unit further comprising a shaft rotatably secured to said unit and fixedly connected to said one end of each of said supporting arms, said elevating mechanism comprising a lever rigidly secured at one end to said shaft, fluid pressure actuated means comprising a cylinder and a piston rod, said cylinder being pivotally mounted on said unit at a point near said shaft, said piston rod being connected to the other end of said lever for movement thereof upon admission of a fluid pressure medium to said cylinder.

3. In a harvester apparatus as defined in claim 1, said other ends of said arms being pivotally mounted on said vehicle, said vehicle being provided at the front end thereof with power take-off means driven by the motor of said motor vehicle, drive means operatively connected to said corn picking device, to said husking means and to said conveyor means, said drive means comprising a first gearing including a plurality of rotatable members interconnected by endless flexible means, said drive means further including a second gearing including a further plurality of rotatable members interconnected by endless flexible means, said further plurality of rotatable members including a rotatable member driven by said power take-off means.

4. In a harvester apparatus as defined in claim 3, said rotatable members of said second gearing including a guide wheel rotatably mounted on said shaft and engaging said endless flexible means.

5. In a harvester apparatus as defined in claim 4, said rotatable members of said second gearing including a tension wheel rotatably mounted on said unit at a point near said guide pulley and engaging said endless flexible means.

6. In a harvester apparatus as defined in claim 1, said husking means comprising husking rollers, and said conveyor means being disposed in a substantially straight line direction longitudinally of said husking rollers.

7. In a harvester apparatus as defined in claim 1, said husking means comprising husking rollers, said husking rollers being mounted substantially parallel to but at a small distance from each other, each of said husking rollers having a ring secured at the rear end thereof, said rings being axially displaced relative to each other so that the ring on one of said rollers is disposed closely behind the ring on the other roller, each of said rings having a radial thickness substantially corresponding to the gap between said rollers.

8. In a harvester apparatus as defined in claim 1, said conveyor means having at least one side wall facing toward the side of said vehicle containing the driver's seat, said side wall and one of said guide plates facing in the same direction, each having a window aperture therein.

9. In a corn harvester apparatus as defined in claim 1, means for adjusting the length of said pivotally mounted arm.

10. In a harvester apparatus according to claim 1, a supporting frame of substantially trapezoidal shape having an inclined upper surface, said frame being adapted to be placed on the ground in front of said vehicle to permit said unit after being pivoted to an angle corresponding to the angle of said upper surface to be rested upon said surface for the purpose of removing said unit from said vehicle and for mounting said unit on said vehicle.

References Cited in the file of this patent
UNITED STATES PATENTS
2,834,171    Aber  ------------------ May 13, 1958